United States Patent [19]
De et al.

[11] Patent Number: 5,132,623
[45] Date of Patent: Jul. 21, 1992

[54] METHOD AND APPARATUS FOR BROADBAND MEASUREMENT OF DIELECTRIC PROPERTIES

[75] Inventors: Bibhas R. De, Laguna Beach; Michael A. Nelson, Riverside, both of Calif.

[73] Assignee: Chevron Research and Technology Company, San Francisco, Calif.

[21] Appl. No.: 616,121

[22] Filed: Nov. 20, 1990

[51] Int. Cl.⁵ .................. G01V 3/30; G01V 3/18
[52] U.S. Cl. .................. 324/338; 324/632; 324/639; 343/789
[58] Field of Search ........... 324/338, 632, 639, 641; 343/700 MS, 789

[56] References Cited

U.S. PATENT DOCUMENTS

| | | | |
|---|---|---|---|
| 4,383,220 | 5/1983 | Baldwin | 324/338 |
| 4,511,842 | 4/1985 | Moran | 324/338 |
| 4,652,829 | 3/1987 | Safinya | 324/338 |
| 4,697,190 | 9/1987 | Oswald | 324/338 |
| 4,760,400 | 7/1988 | Lait | 343/700 MS |

Primary Examiner—Kenneth A. Wieder
Assistant Examiner—Jose M. Solis
Attorney, Agent, or Firm—Edward J. Keeling; Matt W. Carson

[57] ABSTRACT

A method and apparatus measures dielectric properties over a broad range of frequencies. The functions of various resistivity and dielectric constant measuring devices such as logging tools are combined in a single tool. A measuring tool includes novel transmitting and receiving antennas. Electromagnetic energy flows to a transmitting antenna. A stripline adapter permits transmission to a stripline having a metallic central strip. A strip face is bent at approximately right angles, and has a length that is compatible with the desired frequency coverage. A ground plane extends from the stripline adapter to the right angle bend, and a void exists between the center strip and the ground plane. A dielectric is positioned to nearly fill the void. The antennas are positioned so that the strip face lies flush with the tool face, to permit electromagnetic energy to be transmitted into and out of the material to be analyzed. An enclosure comprised of four metallic walls surrounds the stipline, and is in electrical contact with the ground plane and the stripline adapter. The invention permits an analysis of the fluids in the material as well.

51 Claims, 8 Drawing Sheets

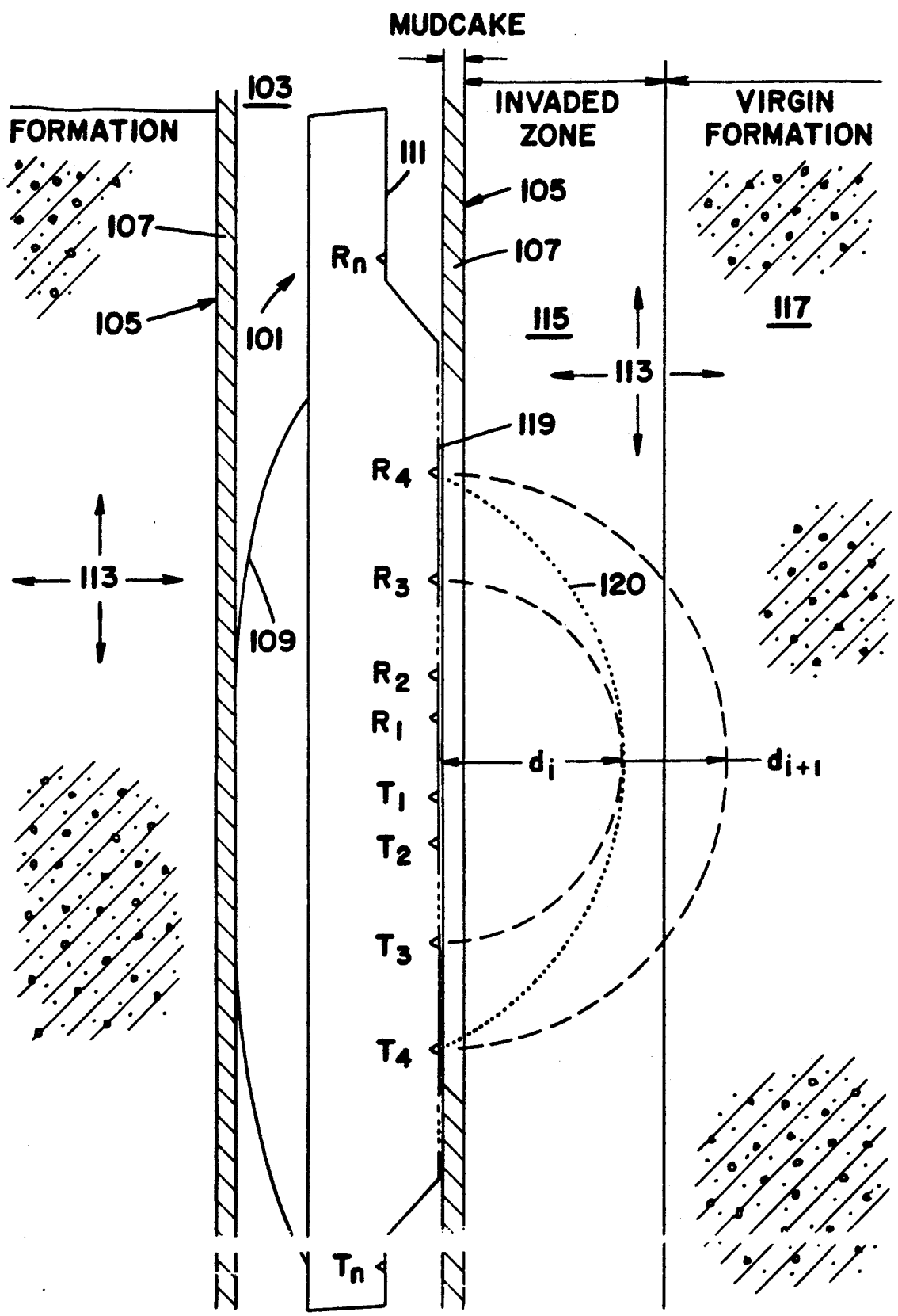
FIG_1

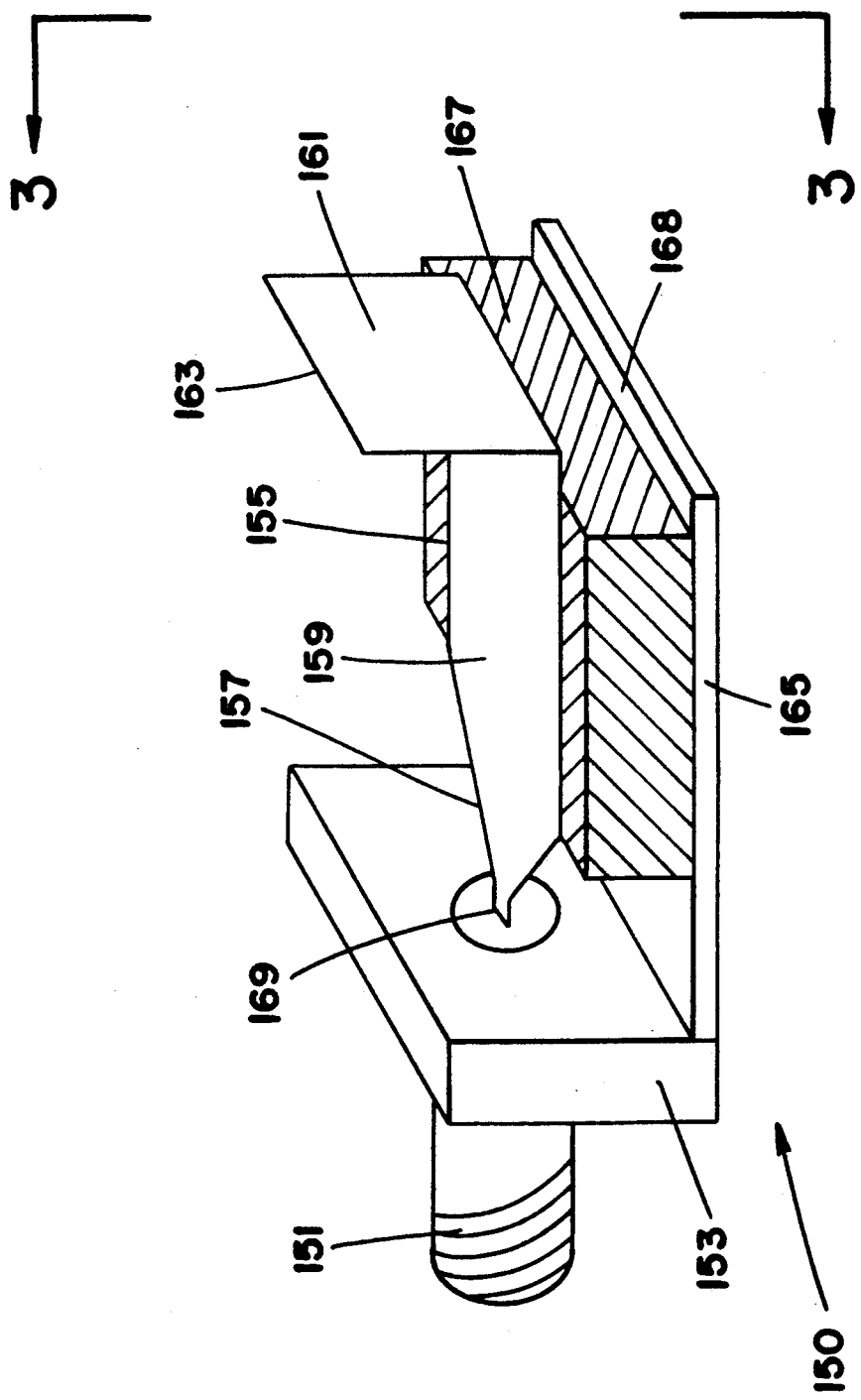
FIG_2

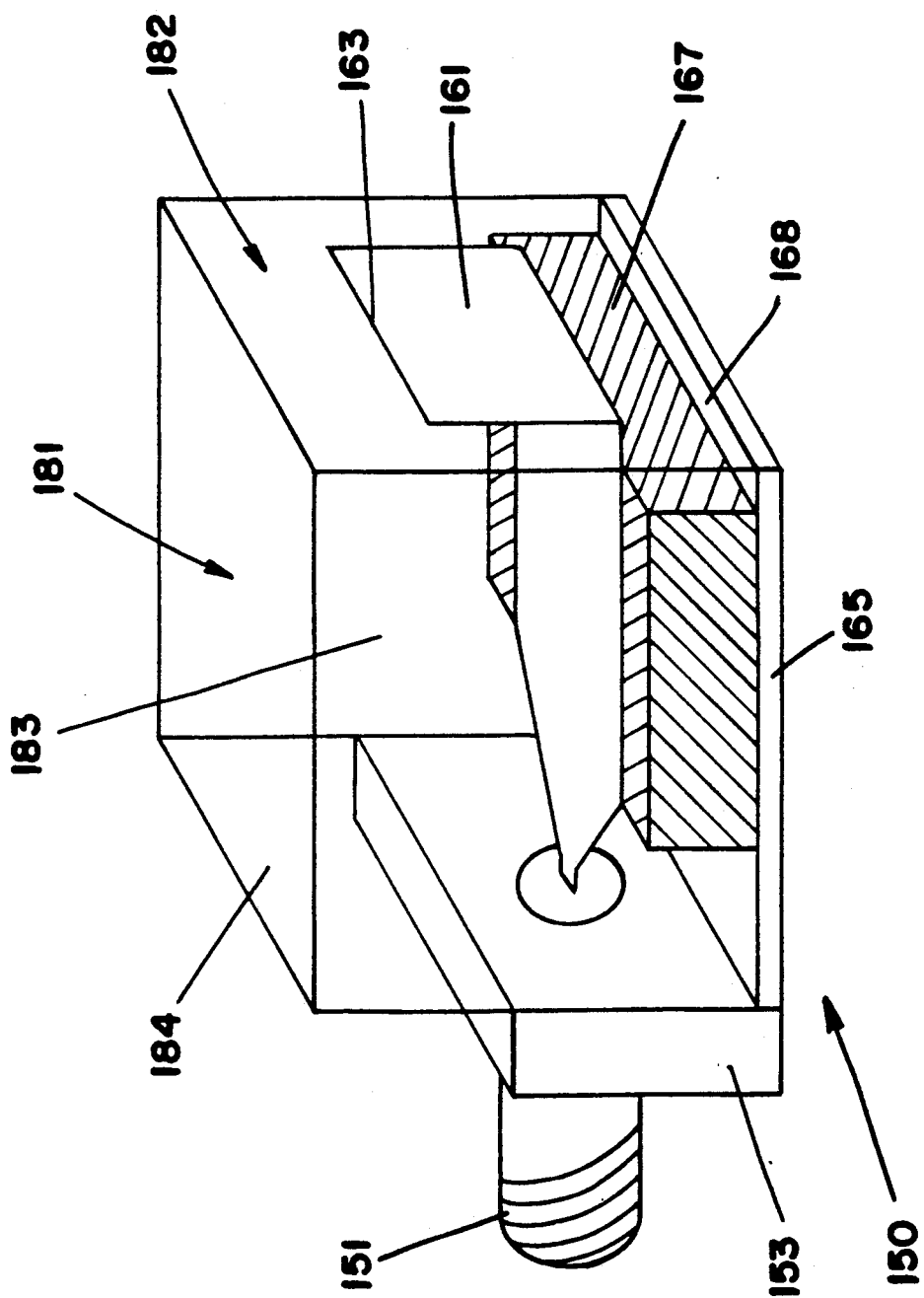
FIG_2A

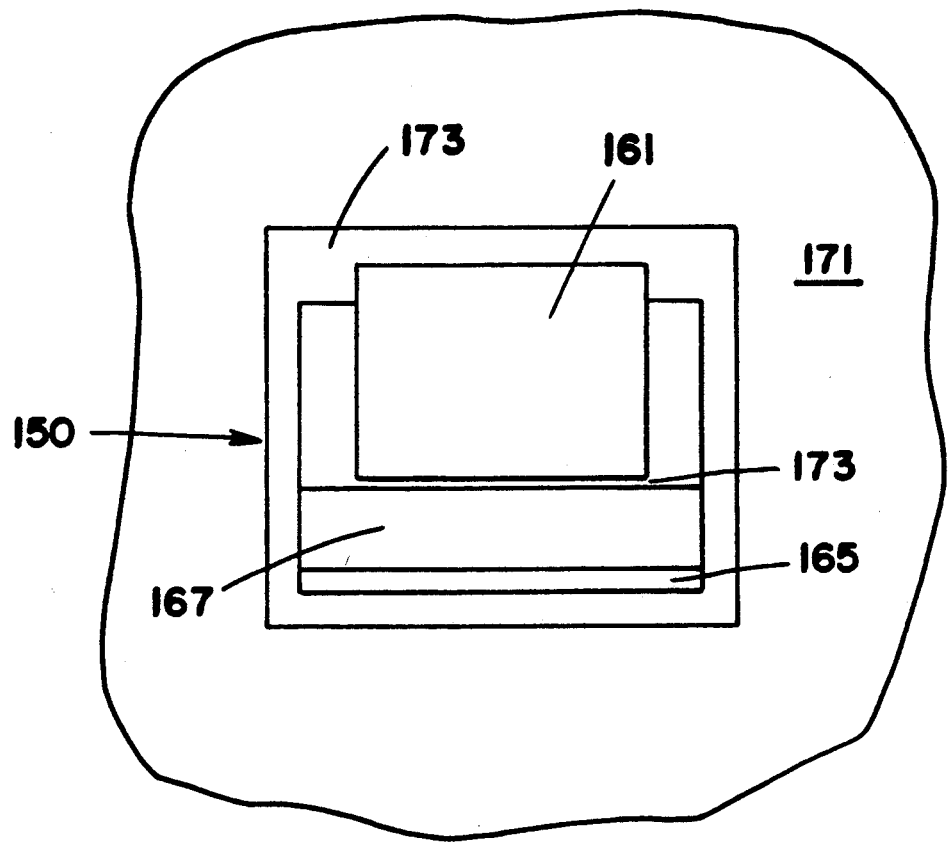
FIG_3

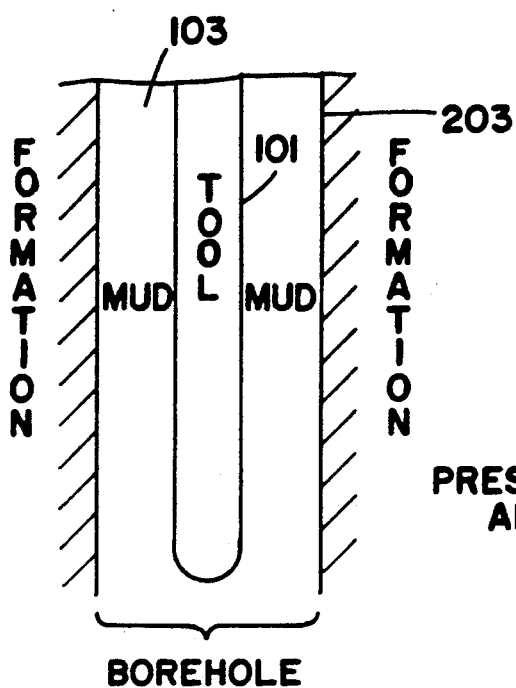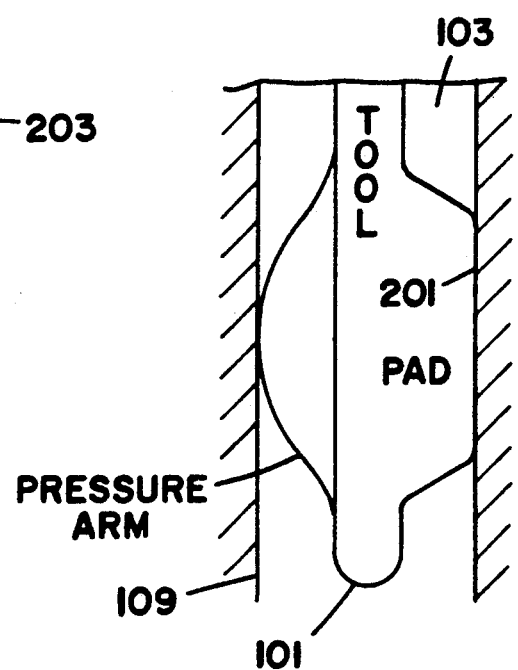
FIG_4A  FIG_4B
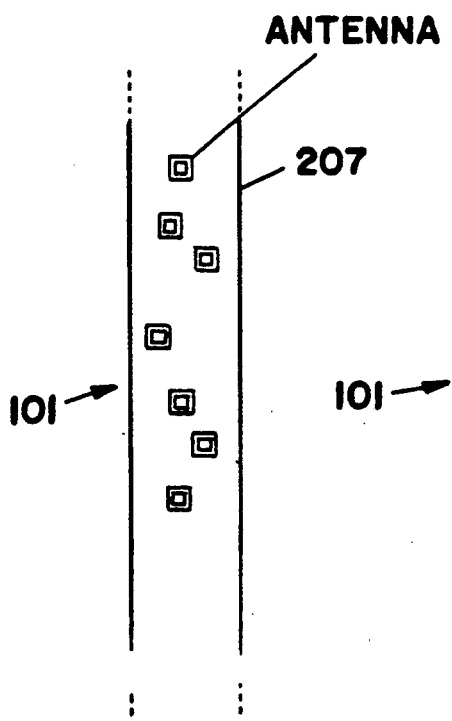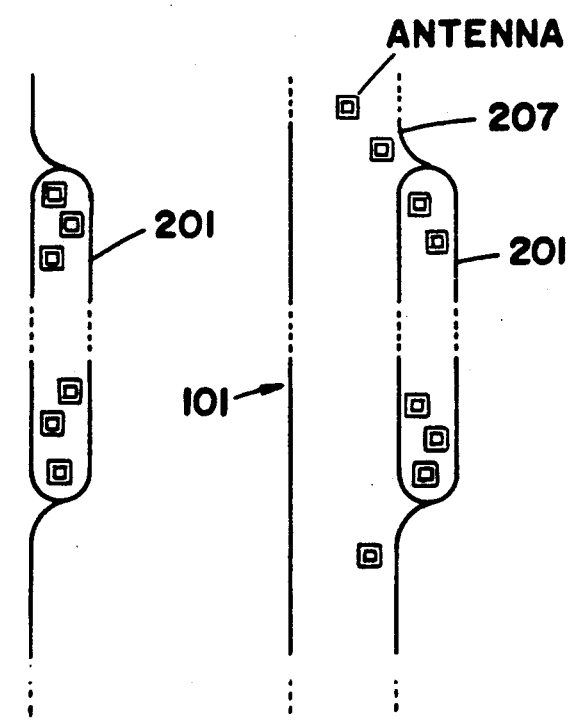
FIG_4C  FIG_4D  FIG_4E

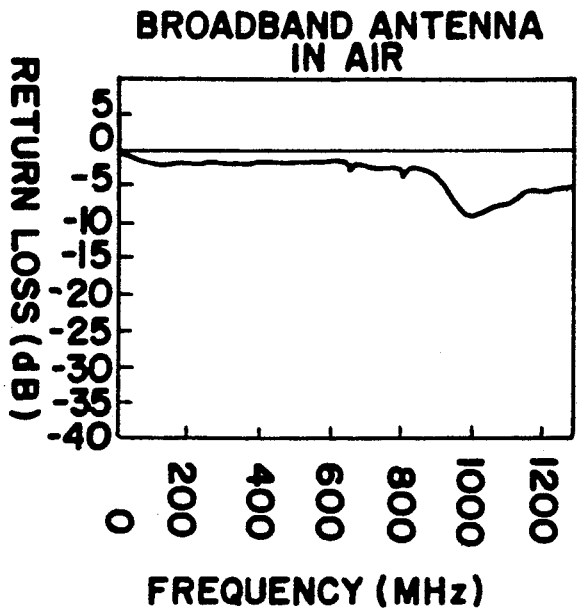
FIG_5A
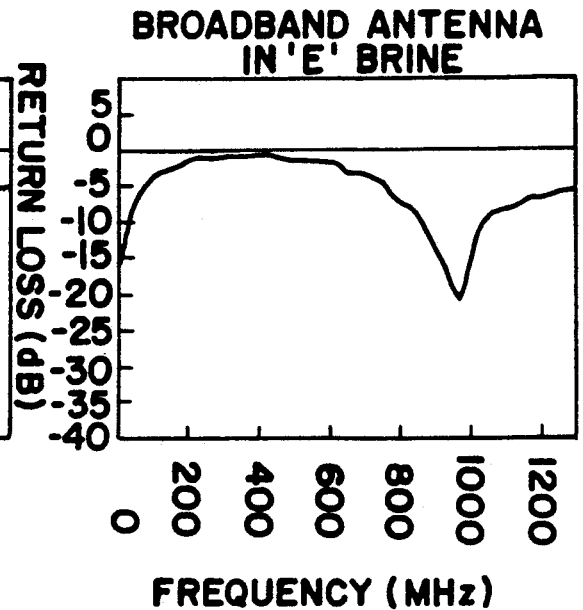
FIG_5B
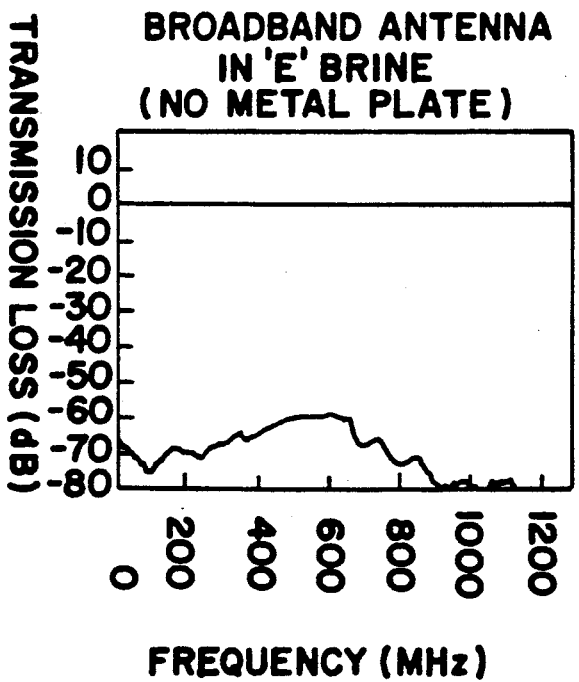
FIG_5C
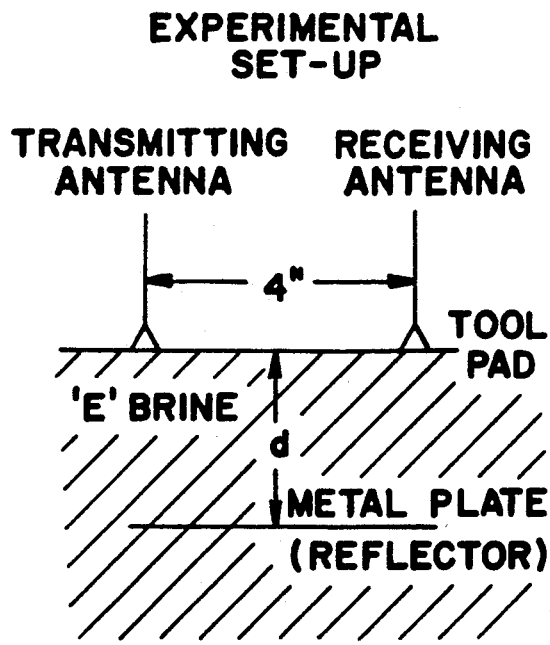
FIG_5D

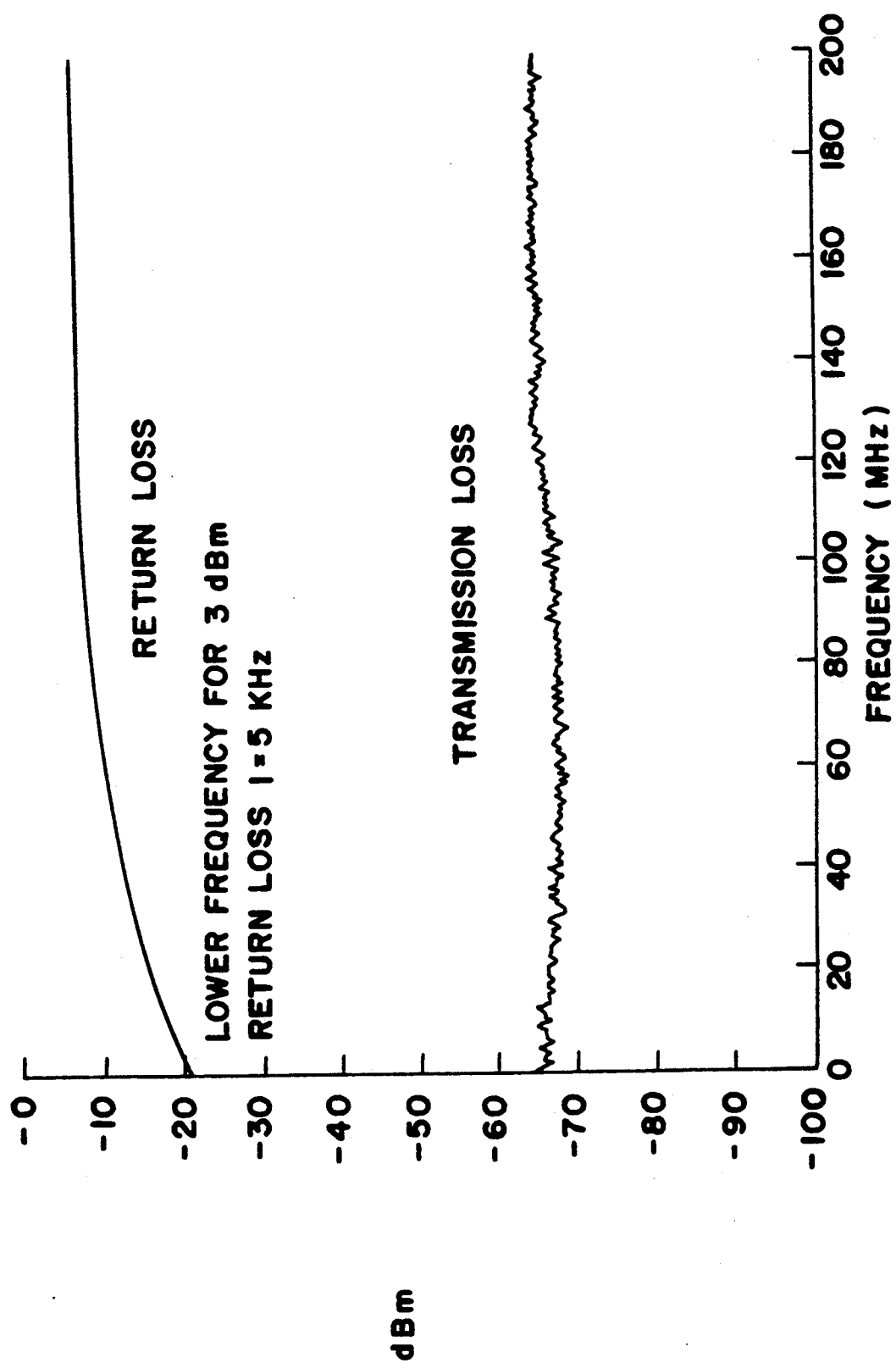
FIG_6

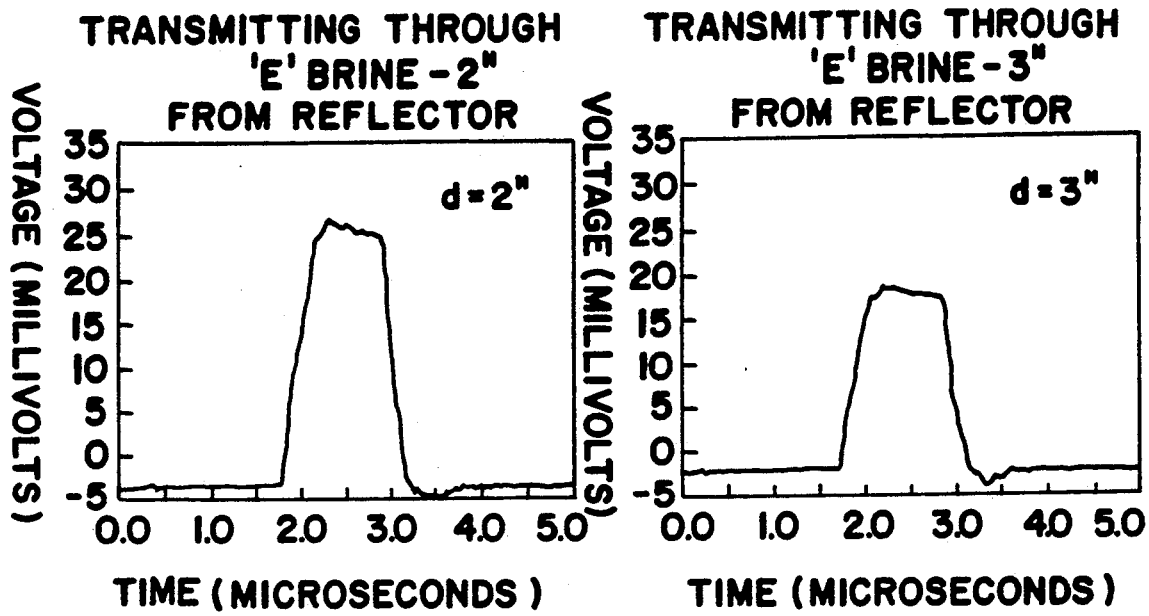
FIG_7A  FIG_7B
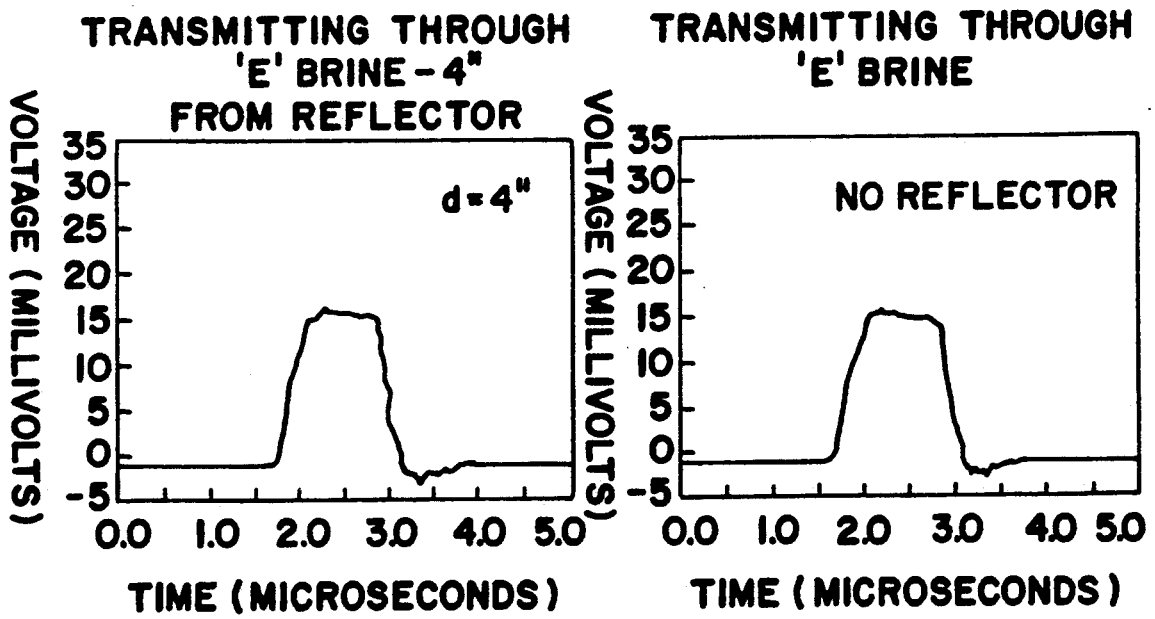
FIG_7C  FIG_7D

METHOD AND APPARATUS FOR BROADBAND MEASUREMENT OF DIELECTRIC PROPERTIES

FIELD OF THE INVENTION

The present invention relates generally to the analysis of materials having dissimilar dielectric properties. More specifically, this invention provides an antenna which can combine the functions of various resistivity and dielectric constant measuring devices into a single tool, capable of operating over a wide range of frequencies. It is particularly useful in the field of well logging.

BACKGROUND OF THE INVENTION

It is well known to log or record certain electrical characteristics of earth formations surrounding a well borehole as a function of depth in order to determine the location and extent of oil-bearing strata and to quantify the amount of oil present in such strata. A log of formation resistivity versus depth may indicate the presence of hydrocarbons, since hydrocarbon-bearing formations typically exhibit a higher resistivity than formations containing mostly salt water. There are only three material parameters which affect an electromagnetic wave. They are conductivity (resistivity), magnetic permeability and dielectric constant. Conductivity provides an indication of the energy absorbing characteristics of the medium, while magnetic permeability and dielectric constant give a measure of the energy storing capacity of a material. The magnetic permeability of most earth materials is the same and is equal to the magnetic permeability of free space. It is therefore of very little use in electrical logging techniques.

It is well known that conductivity or resistivity (which is the reciprocal of the conductivity) has wide variation in value for earth materials and strongly affects electromagnetic waves. A propagating electromagnetic wave has two fundamental characteristics, amplitude and phase. By comparing the amplitude and phase of an electromagnetic wave as it passes receivers, propagation characteristics due to formation may be studied. Measurement of these two characteristics (or equivalently, the wave travel time and attenuation) may be used to determine the dielectric constant and the resistivity of the media through which the wave is propagated.

Dielectric oil well logging is aimed at determining the water saturation and the water salinity in the formation from measurements of the dielectric constant and the resistivity of the formation. A number of criteria enter into the selection of the frequency of the electromagnetic wave used to probe the formation. Depending on these criteria, service companies have fielded a number of different logging tools at different frequencies. However, no one tool in the prior art is capable of probing a formation over a broad band of frequencies. It is therefore advantageous to extend the frequency range to include the function of the dielectric and the resistivity (induction) logging tools.

The objective of dielectric logging is to measure the dielectric constant and the conductivity of earth formations at a specific frequency, and deduce therefrom the water saturation and the salinity of this water. It has been found that logging at various frequency domains has various specific advantages. For example, logging at relatively high frequencies, near 1000 MHz, one probes a depth of only a few inches into the formation, so that here one measures essentially the properties of the invaded zone (i.e., the zone where the formation fluid has been displaced by the fluid filtrate from the mud in the borehole). On the other hand, logging at relatively low frequencies, near 20 MHz, allows one to probe much deeper into the formation (~ a few feet), yielding perhaps information on the virgin formation. Logging at intermediate frequencies causes one to probe intermediate depths. The low frequency tools are of the centralized mandrel type, since at these frequencies the loss of energy in the mud annulus between the tool and the formation can be tolerated. At high frequencies, however, this loss would be prohibitive, and hence the high frequency tools must necessarily be of the pad type, where the pad directly contacts the formation or borehole wall.

The development of tools at these many different frequencies shows that it is advantageous to create a single tool capable of logging:
  (i) at a number of discrete frequencies
  (ii) over a continuous range of frequencies employing the swept frequency technique, and
  (iii) in the time-domain, resulting - upon inversion - in the same information as in (ii) above.

The main advantages of such a tool would be:
  (i) it would yield the profile of water saturation and water salinity with distance from the wellbore, and
  (ii) since a large amount of information would be gathered, this makes it possible to deduce, from the dielectric log alone, the porosity, in addition to the water saturation, and the water salinity.

U.S. Pat. No. 4,899,894, issued to Katahara et al., describes an acoustic logging tool, and does not discuss electromagnetic logging. It uses a plurality of acoustic frequencies only to accommodate a wide variety of formations having different preferred logging frequencies, and does not teach a method of broadband logging over each formation.

U.S Pat. No. 3,982,176, issued to Meador, discloses a conventional induction log (20 KHz) and a conventional dielectric log (16 MHz) in single tool, using different antennas (coils) for the different frequencies. This is a mandrel type tool, that hangs freely in a wellbore with an annulus of mud around it. There is no mention of broadband logging.

U.S. Pat. No. 4,451,789, also issued to Meador, discloses a method of depth-probing the formation by changing the transmitter-receiver spacing. Frequency variation is not discussed. Although Meador uses three frequencies, they are very closely spaced, and are not used for the purpose of broadband logging. Meador simply uses slightly different frequencies as a way of labeling the transmitter-receiver pairs It is therefore essentially a single frequency tool. It is also a mandrel type tool, which hangs freely in a wellbore.

U.S. Pat. No. 4,774,471, issued to Sims et al., discloses a single-frequency (between 10 MHz and 200 MHz) mandrel type tool Sims does not discuss how their antenna can accommodate this frequency range, or whether different antennas are used for different frequencies. This patent only uses a wider range of frequencies within the operation of an earlier tool. The patent does teach that broadband dielectric logging is useful, however.

The largest hurdle to developing a broadband dielectric logging tool has been the lack of a suitable broadband antenna that can couple electromagnetic energy to and from a formation, and that is compact enough to fit within the confines of a logging tool.

An additional advantage is that a dielectric measuring apparatus can be applied to the field of medical technology. For example, U.S. Pat. No. 4,240,445 issued to Iskander et al. teaches a method of coupling electromagnetic energy into a material such as tissue, to measure water content. Measuring lung water content is an especially useful application. However, Iskander's device is so large that only a few antennas can be place on the chest, and the antenna cannot be described as a point source. Also, the electric field vanishes at some distance from the antenna, as the electric fields in the two parallel slots are oppositely directed. Furthermore, a resistor is included in the antenna, which dissipates much of the electromagnetic energy in the antenna itself. Additional prior work includes M. F. Iskander and C. H. Durney (1980): "Electromagnetic Techniques for Medical Diagnosis: A Review", Proceedings of IEEE, vol. 68, no. 1. and M. F. Iskander et al (1982): "Two-dimensional Technique to Calculate the EM Power Deposition Pattern in the Human Body", Journal of Microwave Power, vol. 17, no. 3.

The prior work is limited in the attempts at broadband logging (or measuring) in that no suitable single antenna element has been designed which can couple electromagnetic energy into a material, whether it be a geologic formation or tissue, over a broad range of frequencies, that is also sufficiently compact and is capable of handling high power levels. There is therefore a need for a device and a method for use in such broadband logging/measuring/heating applications.

SUMMARY OF THE INVENTION

The present invention is surprisingly successful in providing a method and apparatus for combining the functions of various resistivity and dielectric constant measuring devices and electromagnetic energy coupling device into a single tool, capable of operating over a wide range of frequencies. It is especially useful in well logging applications. The apparatus is capable of taking broadband measurements of materials having dissimilar dielectric properties.

A measuring tool such as a logging tool, having a tool face, also has a novel transmitting and a novel receiving antenna. Electromagnetic energy is transmitted to a transmitting antenna. A stripline adapter permits the energy to flow to a stripline having a metallic central strip. A strip face of the central strip is bent at approximately right angles, and has a height that is compatible with desired frequency coverage.

A ground plane extends from the stripline adapter to the right angle bend, so that a distal end of the central strip extends away from it, and a void is created between the center strip and the ground plane.

A dielectric is positioned to nearly fill the void. The dielectric is comprised of a material having a very high dielectric constant and a very low energy loss. The transmitting antenna is positioned so that the ground plane is fixedly connected to the measuring tool, and the strip face lies flush with the tool face, so that electromagnetic energy can be transmitted into the material to be analyzed.

An enclosure surrounding the stripline is comprised of four metallic walls which are positioned in electrical contact with the ground plane and the stripline adapter, so that the strip face is nearly centered in the opening created by the walls and the ground plane.

A loss-less, non-conducting material fills in any remaining open space in the enclosure, so that the non-conducting material forms an additional wall that is really flat with the strip face.

A receiving antenna is comprised in essentially the same manner as the transmitting antenna, and is positioned in the tool so that it can receive the electromagnetic energy which has traveled through the material being probed. A means for monitoring the received energy detects changes as the apparatus is moved across the material.

In another embodiment of this invention, broadband measurements are taken to determine the nature of a fluid in a material such as a geologic formation.

It is one object of this invention that electromagnetic energy is transmitted and received over a wide frequency range, specifically from 2 KHz to 1 GHz.

The tool may further comprise a pad, which conforms to the inside of a wellbore and holds the antennas. At least one transmitting and one receiving antenna are necessary. A plurality of each is often desirable. Some antennas may be staggered in a spiral fashion, to prevent undesirable coupling between adjacent antennas.

Fluids analyzed include water and hydrocarbons. Electromagnetic energy is monitored to provide an indication of the porosity, salinity, and water saturation of the material to be analyzed. Depth probing a geologic formation is a particularly useful application, to measure the nature of fluids as a function of the distance from the antennas.

The above and other embodiments, objects, advantages, and features of the invention will become more readily apparent from the following detailed description of the invention, which is provided in connection with the accompanying drawings.

DESCRIPTION OF THE DRAWINGS

FIG. 1 is a schematic, sectional view of the inventive logging (or measuring) tool positioned in a wellbore.

FIG. 2 shows a top, front, and side view of the novel transmitting antenna.

FIG. 2A is the same view as FIG. 2, further illustrating the enclosing metallic walls.

FIG. 3 shows an antenna mounted on a tool face.

FIG. 4A–4E shows schematic side views of the inventive apparatus as applied to well logging technology.

FIG. 5A–5E show three graphs of transmission and return loss as a function of frequency.

FIG. 6 is a graph of transmission and return loss as a function of frequency, for low frequencies.

FIG. 7A–7D show four graphs of time-domain transmission measurements at various distances from a metal reflector plate in a brine.

DETAILED DESCRIPTION OF THE INVENTION

In accordance with the present invention, a new improved method and apparatus for determining the nature of various materials and the fluids contained therein, using a broadband measuring apparatus, has been developed.

Referring to the drawings, a first embodiment of the inventive broadband logging (or measuring) tool 101 is shown in FIG. 1, positioned in a wellbore 103. The wellbore wall 105 is sometimes lined with a layer of mud cake 107. Pressure arm 109 positions tool face 111 near wellbore wall 105, so that transmitting antennas such as $T_1$ and $T_2$ and receiving antennas such as $R_1$ and $R_2$ are positioned close to the mud cake 107 or the wellbore wall 105. The transmitting antennas, such as $T_n$ and the receiving antennas, such as $R_n$ are mounted on the tool face 111 above and below the tool pad 119, and are positioned opposite the wallbore 105, and are separated from It by the mud cake 107 and the mud in the wellbore 103. The tool face 111 is defined as the outer surface of the logging tool 101.

A material, in this case a geologic formation 113 surrounds the wellbore. An invaded zone 115 represents the region of the formation 113 that has been permeated by the mud filtrate The outer region 117 is that part of the formation 113 that has not been permeated by the mud filtrate In a formation evaluation program, it is desirable to know the properties of both regions, as a function of distance from the antenna or tool face 111. This may be called depth-probing.

In FIG. 1, the logging tool 101 has a pad 119 or pad-type device so that some or all of the antennas can be positioned very close to the formation so that electromagnetic energy can by transmitted through the formation. The antennas work in pairs. That is, antennas $T_1$-$T_4$ and $T_n$ are transmitting 1 antennas, and antennas $R_1$-$R_4$ and $R_n$ are receiving antennas. Antenna $T_1$ transmits electromagnetic energy though the formation, and antennas $R_1$ and $R_2$ through $R_n$ receive it. Antenna $T_2$ transmits electromagnetic energy to antennas $R_1$ and $R_2$ through $R_n$, and so on, through antennas $T_n$. The antennas can all be positioned in a vertical line, as shown, or they can be staggered, in the azimuthal direction. It is possible for any given antenna to alternately play the role of a transmitting or a receiving antenna.

For any pair of antennas, $T_iR_j$, by measuring the phases and amplitudes of the received power at $R_j$ and of the reflected power at $T_i$, the dielectric constant and the conductivity of the region probed by the pair $T_iR_j$ can be determined. From the dielectric constant and the conductivity, water saturation and salinity can be calculated using theoretical expressions well known in the art. It is desirable that the antennas can transmit and receive energy over the entire frequency range of interest. For dielectric well logging, a frequency range of approximately 10–1000 MHz is desirable. To include resistivity and induction logging, this range can be extended down to a few kilohertz.

The depth of investigation for a pair such as $T_3R_3$ is a function of the frequency of the probing radiation. As this frequency is gradually reduced from a high value, the depth increases until at some frequency $f_i$ it equals the depth $d_i$, roughly obtained by drawing a semicircle with $T_3R_3$ as the diameter as seen on FIG. 1 (dashed lines). Decreasing the frequency further does not increase the depth of investigation much further Thus, each pair $T_iR_j$ probes a zone of depth $d_i$ appropriate to that pair and to the frequency $f_i$ for that pair. In this way, a set of broadband antennas placed with different spacings permits information about a set of zones of varying depth to be obtained (the longer the spacing, the lower is $f_i$). The above discussion also illustrates that for a given transmitter-receiver pair, some depth-probing is possible, by changing the frequency. Thus, by having different transmitter-receiver spacings and the broadband capability, redundant depth-probing is possible.

Another use of the first embodiment incorporates the concept of standalone logging. In conventional dielectric logging where the dielectric constant and conductivity of a zone is measured at a single frequency, one needs an independent knowledge of the porosity of the zone in order to convert this information to water saturation and salinity. This porosity is usually derived from a separate logging tool. However, if the same zone could be probed in two very distinct frequencies, then the dual frequency data can be inverted to simultaneously calculate the porosity, water saturation and salinity, without the need of a separate logging tool.

Referring to FIG. 1 for the pair $T_4R_4$, if the frequency is raised from $f_{i+1}$ (which is the frequency corresponding to the maximum depth of investigation $d_{i+1}$ for the pair), the zone of investigation will shrink from $d_{i+1}$ until at some frequency $F_{i+1}$, this zone (dotted line 120) will have a depth equal $d_i$. Thus, having broadband antennas with different spacings permits us to probe the same depth $d_i$ with two different frequencies.

An example of the inventive transmitting antenna 150 is shown in FIG. 2. A coaxial connecting means, such as coaxial connector 151 is electrically connected to a stripline adapter 153 which is capable of transmitting electromagnetic energy from the coaxial connector 151 to a stripline section with metallic central strip 155. An especially useful stripline adapter is a model No. 3070-1404-10 designed by Omni-Spectra, or other types of microwave stripline adapters. Other types of transmission means may be utilized to transmit electromagnetic energy to the antenna. For example, a strip transmission line may be electrically connected to the stripline section having the metallic central strip 155. As a commercial coaxial-to-stripline transition means has been utilized, the dimensions included herein reflect this means. One knowledgeable in the art would realize that the dimensions may be altered to change frequency coverage and to fine-tune performance.

Metallic center strip 155 has a front end 157, a flat strip body 159, a flat strip face 161, and a distal end 163. The front end 157 is electrically connected to the center conductor 169 of the stripline adapter 153. Solder is a particularly useful connecting means. Flat strip body 159 may also be tapered to come to a point at front end 157 to provide a smooth electrical transition between the center conductor 169 and the center strip 155. The strip face 161 is bent at approximately right angles to strip body 159, and has a height that is measured from the right angle bend to distal end 163. The height is compatible with the desired frequency coverage. The longer the height, the more lower frequency coverage is allowed. A $\frac{1}{4}''$ height permits a frequency range of approximately 2 KHz→1 GHz. The metallic center strip 155 can be made of any metal. Copper, brass, or aluminum are especially useful.

A ground plane 165 extends from stripline adapter 153 to the right angle bend in the center strip 155, so that the distal end 163 extends away from the ground plane 165 and so that a void exists between the center strip 155 and the ground plane 165. Ground plane 165 is comprised of a metal. Commercial grade stainless steel is particularly useful. It is desirable to keep the ground plane and center strip as short at possible, to permit the apparatus to remain as compact as possible and to allow the use of as many antennas as possible.

The void between the ground plane 165 and the center strip 155 is largely filled with a dielectric 167. The dielectric 167 should have a very high dielectric constant and a very low loss. By loss, we mean the dissipation of energy. The dielectric 167 can be a ceramic dielectric, and comprised of material such as Barium Titanate or Lead Zirconate Titanate. A crystalline dielectric may also be used, although more expensive. The thickness of the dielectric 167 is determined by the stripline adapter 153 used. The dielectric 167 acts to make the capacitance of the center strip 155 very large.

The construction of the antenna is completed by enclosing the center strip 155 by metallic walls 181, 182, 183, and 184, which contact the ground plane 165 and the adapter 153 electrically, as shown in FIG. 2A. The walls add rigidity and prevent leakage of the electromagnetic radiation. The strip face 161 is approximately centered in the rectangular opening created by the edges of the walls and the edge of the ground plane 165. Thus, the distance between an edge of the strip face 161 and the adjacent edge of a wall is substantially the thickness of the dielectric 167. The entire void space in the antenna enclosed by the walls, including the set back 168 at the dielectric edge, is filled with a loss-less, non-conducting material such as a mixture of epoxy and alumina which sets hard, seals the antenna, and makes it more rugged.

The ground plane 165 and the walls 181, 182, 183, and 184 are fixedly connected to a logging (or measuring) device or tool as seen in FIG. 3. The strip face 161 is positioned to lie flush with the tool face 171 (or a tool pad), so that the transmitting antenna 150 can transmit electromagnetic energy into a material such as a geologic formation or mammal tissue. Void space 173 is filled with a loss-less, non-conducting material such as an epoxy-aluminum compound. The ground plane 165 and the walls 181, 182, and 183 connect to the tool face (or tool pad) and the center strip 161 becomes the sensor "button".

A receiving electromagnetic antenna is comprised in essentially the same manner as the transmitting antenna, and is positioned in the logging tool in the same manner as the transmitting antenna, so that the receiving antenna can receive the electromagnetic energy which has traveled through the material that is analyzed.

The logging tool also contains a means for monitoring the received electromagnetic energy for changes, as the tool is moved across the material and moves across the interface of materials having dissimilar dielectric properties so that the interface can be located, and the nature of the material can be evaluated. An example of frequently studied dielectrically dissimilar materials are hydrocarbons and water, both of which are normally contained in the pore spaces of rocks.

The logging tool is capable of transmitting and receiving electromagnetic energy that has a range of frequencies. The range of frequencies is from about 2 KHz to about 1 GHz. In this embodiment, the electromagnetic energy is of sufficient strength to travel through the material (or formation) to the receiving antenna as a propagating wave. The amplitude and the phase of the received signal contain information (dielectric constant and conductivity) about the formation. A duplicate receiving antenna is usually employed, thereby obtaining measurements that eliminate certain unknown factors. Additionally, by employing a duplicate transmitting location above or below the pair, the effects of alternate upward and downward transmission are averaged to achieve "borehole compensation", known in the art. In a second embodiment, the logging (or measuring) tool (a device) determines the nature of a fluid in a material. The material may be, for example, a geologic formation or may be a mammal tissue. In this embodiment, the device is constructed as in the first embodiment, except that the means for monitoring the electromagnetic energy for changes as the apparatus is moved across the material determines the nature of the fluid. For a geologic formation, the fluids analyzed can be hydrocarbons and water.

In either the first or second embodiment, the electromagnetic energy can be monitored to provide an indication of the salinity and the water saturation of the material. If the same zone could be probed in two very distinct frequencies, then the dual frequency data can be inverted to simultaneously calculate the porosity, also.

The apparatus transmits electromagnetic pulses of designated profile shapes into the material to be analyzed, such as a geologic formation. The pulses are received by antennas spaced at different distances from the transmitter. The different receiver spacings correspond to different depths of investigation. When the received pulses are analyzed, one obtains a broadband dielectric spectrum for different depths in the formation. Together, all this information yields the depth-dependent water saturation, salinity, porosity and matrix dielectric constant (matrix identification). The depth-dependent water saturation could then be analyzed to give an estimate of the permeability. The other conventional parameters such as formation factor can also be derived from the data, if there is present in the well, a zone with 100% water saturation.

The present invention may operate either in time or frequency domain, or both. The above paragraph describes the application in the time domain. Because of the compact size of the invention, many such sensors can be installed on a tool, to comprise an array of sensors capable of "depth-probing" the formation (i.e., measuring the saturation and the salinity as a function of distance from the wellbore). The depth-probing and the wide frequency coverage aspects can possibly be combined to give the tool a stand-alone character: It can, in and of itself, determine the porosity, the salinity, and the water saturation without the need of an additional porosity tool (which is required in the present art).

FIGS. 4A-4E illustrate various applications of the inventive apparatus as applied to well logging technology. The antennas (both receiving and transmitting) can be mounted on a pad 201 or pad-type device which is designed to substantially conform to the inside of the wellbore 203, as seen in FIGS. 4B, 4D, and 4E. The pad acts to reduce or prevent propagation of the electromagnetic energy through the lossy mud 205. At low frequencies, however, the loss in the mud is tolerable and the antennas can be mounted on the tool face 207, on a centralized tool, as shown in FIGS. 4A and 4C. A combination of two arrangements is also possible, as seen in FIG. 4E, where antennas are positioned both on tool face 207 and on a pad 201 or pad-type device to include low frequency waves. The vertical spacings and azimuthal orientations are selected from theoretical considerations known in the art. Therefore, the device may comprise a single transmitting antenna and one or more receiving antennas, or it may comprise a plurality of transmitting antennas. The antennas may be oriented in several arrangements. They may be staggered about the tool face and/or pad or may be staggered in a spiral fashion. Staggering of the antennas minimizes unwanted coupling between adjacent antennas, while still permitting a short spacing distance between antennas.

It is advantageous to use several antennas at preselected spacings. This provides a variable depth of investigation, as one transmitting antenna could be used with a plurality of receiving antennas. A variable frequency of investigation is also possible, as larger spacings are required with larger wavelengths. Also, redundant spacings provide enhanced quality control.

The apparatus can operate in the frequency domain, using a single frequency, multiple frequencies (such as simultaneous, selectable, or time-multiplexed for example), or swept frequency techniques Or, the apparatus can operate in the time domain, using pulses of a wide variety of shapes, widths, rise and fall times, etc. When the pulses are transformed to the frequency domain, either electronically using a spectrum analyzer, or numerically using mathematical transforms, the same information is obtained as would be given by a frequency domain tool.

THEORY OF TIME-DOMAIN DIELECTRIC LOGGING

A time-domain tool eliminates much of the cumbersome electronics of a swept frequency or a multiple frequency tool, and shifts the burden of the electronics to software. Consider a tool with a broadband transmitting antenna located at $Z=0$ and two identical broadband receiving antennas located at $Z_1$ and $Z_2$ ($Z_0$, $Z_1$ and $Z_2$ being three points along the axis of the wellbore). Suppose that an electromagnetic pulse $f(t, 0)$ of a finite duration is launched into the formation at $Z=0$ beginning at $t=0$ ($f(t, 0) = 0$ for $t \leq 0$ and $t > t_o$, say).

The Fourier frequency components of this pulse are given by:

$$F(\omega, 0) = \frac{1}{2\pi} \int_o^a f(t, 0) e^{i\omega t} dt \quad (1)$$

where $\omega$ is the circular frequency of the radiation. Similarly, the pulses $f(t, Z_1)$ and $f(t, Z_2)$ received at $Z_1$ and $Z_2$ can be decomposed into their spectral components:

$$F(\omega, Z_1) = \frac{1}{2\pi} \int_o^a f(t, Z_1) e^{i\omega t} dt \quad (2)$$

$$F(\omega, Z_2) = \frac{1}{2\pi} \int_o^a f(t, Z_2) e^{i\omega t} dt \quad (3)$$

Now, the relationship between the transmitted and received Fourier components is $$F(\omega, Z_1) = F(\omega, 0) e^{ikZ_1} M(\omega) G(\omega, Z_1) \quad (4)$$

$$F(\omega, Z_2) = F(\omega, 0) e^{ikZ_2} M(\omega) G(\omega, Z_2) \quad (5)$$

where
- $k = \alpha + i\beta$ is the complex wave number and
- $\alpha =$ phase shift of the wave in radians/meter
- $\beta =$ attenuation of the wave in nepers/meter
- $M(\omega) =$ factor resulting from mismatches at the transmitting antenna/formation and receiving antenna/formation interfaces
- $G(\omega, Z) =$ factor resulting from geometric spread of radiation.

Dividing (5) by (4) eliminates the term $M(\omega)$, and we have $$\genfrac{}{}{0pt}{}{\alpha}{\beta} = \frac{1}{\Delta Z} \frac{G(\omega, Z_2)}{G(\omega, Z_1)} \genfrac{}{}{0pt}{}{Re}{Im}\left[ \ln\left\{ \frac{F(\omega, Z_2)}{F(\omega, Z_1)} \right\} \right] \quad (6)$$

whence the relative dielectric constant $\epsilon$ and the conductivity $\sigma$ are obtained using the relations:

$$\epsilon = \frac{\alpha^2 - \beta^2}{\epsilon_o \mu_o \omega^2} \quad (7)$$

$$\sigma = \frac{2\alpha\beta}{\mu_o \omega} \text{ mho/m} \quad (8)$$

where $\alpha$, $\beta$, $\epsilon$ and $\sigma$ are all function of frequency.

The geometric factor in Equation (6) has to be determined experimentally by pulsing the tool in air and in other lossy media of known, lossy dielectric properties, such as brine.

In the alternative to Equation (6), the dielectric properties may also be derived by referencing to only one receiver, and using equations (4) or (5). Here, the quantity $M(\omega)$ is determined by measuring the power reflected back into the transmitting antenna due to the mismatch, as described in U.S. Pat. No. 4,831,331 issued to De and Keetch.

A prototype logging tool pad was constructed, with the inventive antennas. The pad consists of one transmitting and one receiving antenna, the distance between them being variable.

An acceptable dielectric logging antenna must meet the following criteria:
(i) It must be able to couple sufficient energy into and from the formation at its operating frequency to allow probing of the formation;
(ii) This probing energy must penetrate into the formation, rather than clinging to the surface of the tool pad (i.e., it must travel as a freely propagating wave rather than a surface wave guided along the pad).

In the present instance, the above two conditions must hold over the entire range of the frequency of operation.

The first of the above criteria is tested by measuring the return loss for the transmitting antenna, and the transmission loss from the transmitting to the receiving antenna - both as a function of frequency. These measurements are shown in FIG. 5 where the antenna pad is placed in air and against brine of conductivity 0.5 mho/m (to represent a formation). The return loss curve in brine shows that sufficient energy is entering the brine over the frequency range of the measuring device (Hewlett-Packard HP8505A Network Analyzer; 500 KHz - 1300 MHz) to permit probing. The transmission loss shows that sufficient energy is being received at the receiving antenna to permit measurements.

Measurements were made by using another measuring device (HP3577A Network Analyzer; 5Hz - 200 MHz) to test the low frequency limitation of the antenna. The results are shown in FIG. 6, showing that the low frequency limitation is about 5 KHz. The improved return loss performance in the 200 MHz region (at FIG. 5) results from a drying (curing) of the epoxy alumina filling between measurements.

FIG. 7 shows time-domain transmission measurements at various distances (d) to a metal reflector plate in the brine The change in amplitude of the received pulse as a function of the distance of the metallic reflector shows that the energy has penetrated into the brine out to the location of the plate.

While a preferred embodiment of the invention has been described and illustrated, it should be apparent that many modifications can be made thereto without departing from the spirit or scope of the invention. Accordingly, the invention is not limited by the foregoing description, but is only limited by the scope of the claims appended hereto.

What is claimed is:

1. Apparatus for making broadband measurements of materials having dissimilar dielectric properties comprising an enclosed measuring tool having a tool face, said measuring tool further comprising an electromagnetic transmitting antenna, said transmitting antenna further comprising:
    (a) a coaxial cable connecting means and means to transmit electromagnetic energy therethrough;
    (b) a stripline adapter capable of transmitting electromagnetic energy from said coaxial cable connecting means to a stripline having a metallic central strip, said center strip having a front end, a flat strip body, a flat strip face, and a distal end, said front end electrically connected to a center conductor of said stripline adapter, said strip face bent at approximately right angles to said strip body and having a height measured from said right angle bend to said distal end that is compatible with a desired frequency coverage;
    (c) a ground plane which extends from said stripline adapter to said right angle bend, so that said distal end extends away from said ground plane and so that a void exists between said center strip and said ground plane;
    (d) a dielectric largely filling said void, said dielectric comprised of a material having a very high dielectric constant and a very low energy loss, so that said transmitting antenna is positioned so that said ground plane is fixedly connected to said measuring tool and said strip face is positioned to lie flush with said tool face so that said transmitting antenna can transmit electromagnetic energy into said material;
    (e) an enclosure surrounding said stripline comprising four metallic walls, said walls positioned in electrical contact with said ground plane and said stripline adapter, so that said strip face is nearly centered in the opening created by said walls and said ground plane;
    (f) a loss-less, non-conducting material which fills in any remaining open space in said enclosure so that said non-conducting material forms an additional wall that is nearly flat with said strip face;
    (g) a receiving electromagnetic antenna comprised in essentially the same manner as said transmitting antenna, said receiving antenna positioned in said measuring tool in the same manner as said transmitting antenna, so that said receiving antenna can receive said electromagnetic energy which has traveled through said material; and
    (h) means for monitoring said received electromagnetic energy for changes as said apparatus is moved across said materials whereby said dielectric properties can be measured.

2. Apparatus as recited in claim 1 wherein said transmitting antenna transmits and said receiving antenna receives electromagnetic energy over a frequency range of 2 KHz to 1 GHz.

3. Apparatus as recited in claim 1 further comprising a means for positioning said tool face near said material.

4. Apparatus as recited in claim 1 wherein a strip transmission line is electrically connected to said stripline, so that electromagnetic energy can be transmitted thereto.

5. Apparatus as recited in claim 1 wherein said antennas are positioned on a pad-type device.

6. Apparatus as recited in claim 1, further comprising a plurality of receiving antennas.

7. Apparatus as recited in claim 6 further comprising a plurality of transmitting antennas.

8. Apparatus as recited in claim 7 wherein said materials having dissimilar dielectric properties are hydrocarbons and water.

9. Apparatus as recited in claim 1, wherein said broadband measurements are taken to determine said dielectric properties as a function of distance from said antenna.

10. An apparatus for making broadband measurements to determine the nature of a fluid in a material, said apparatus having a tool face and further comprising a first electromagnetic transmitting antenna, said first transmitting antenna further comprising:
    (a) a coaxial cable connecting means and means to transmit electromagnetic energy therethrough;
    (b) a stripline adapter capable of transmitting electromagnetic energy from said coaxial cable connecting means to a stripline having a metallic central strip, said center strip having a front end, a flat strip body, a flat strip face, and a distal end, said front end electrically connected to a center conductor of said stripline adapter, said strip face bent at approximately right angles to said strip body and having a height measured from said right angle bend to said distal end that is compatible with a desired frequency coverage;
    (c) a ground plane which extends from said stripline adapter to said right angle bend, so that said distal end extends away from said ground plane and so that a void exists between said center strip and said ground plane;
    (d) a dielectric filling most of said void, said dielectric composed of a material having a very high dielectric constant and a very low energy loss, so that said first transmitting antenna is positioned so that said ground plane is fixedly connected to said logging tool and said strip face is positioned to lie flush with said tool face so that said first transmitting antenna can transmit electromagnetic energy into said material;
    (e) an enclosure surrounding said stripline comprising four metallic walls, said walls positioned in electrical contact with said ground plane and said stripline adapter, so that said strip face is nearly centered in the opening created by said walls and said ground plane;
    (f) a loss-less, non-conducting material which fills in any remaining open space in said enclosure so that said non-conducting material forms an additional wall that is nearly flat with said strip face;
    (g) a receiving electromagnetic antenna comprised in essentially the same manner as said transmitting antenna, said receiving antenna positioned in said apparatus in the same manner as said transmitting antenna, so that said receiving antenna can receive said electromagnetic energy which has traveled through said material; and (h) means for monitoring said electromagnetic energy for changes as said apparatus is moved across said material, so that the nature of said fluid can be determined.

11. Apparatus as recited in claim 10 wherein said transmitting antenna transmits and said receiving antenna receiver electromagnetic energy over a frequency range of 2 KHz to 1 GHz.

12. Apparatus as recited in claim 1 or 10 wherein said transmitting antenna can alternately function as a receiving antenna and said receiving antenna can alternately function as a transmitting antenna.

13. Apparatus as recited in claim 11 further comprising a pad, said pad substantially conforming to the inside of a wellbore and holding said transmitting and receiving antennas.

14. Apparatus as recited in claim 13 further comprising a plurality of receiving antennas.

15. Apparatus as recited in claim 14 further comprising a plurality of transmitting antennas.

16. Apparatus as recited in claim 15 wherein some of said antennas are positioned on said tool face and some antennas are positioned on said pad.

17. Apparatus as recited in claim 15 wherein some of said antennas are staggered.

18. Apparatus as recited in claim 15 wherein said antennas are staggered in a spiral fashion.

19. Apparatus as recited in claim 10 wherein said fluids are hydrocarbons and water.

20. Apparatus as recited in claim 1 or 10 wherein said ground plane is no greater than 10 mm in length.

21. Apparatus as recited in claim 1 or 10 wherein said strip face has a height that is no greater than 5 mm.

22. Apparatus as recited in claim 1 or 10 wherein said electromagnetic energy is monitored to provide an indication of the porosity of said material.

23. Apparatus as recited in claim 1 or 10 wherein said electromagnetic energy is monitored to provide an indication of the water saturation of said material.

24. Apparatus as recited in claim 1 or 10 wherein said electromagnetic energy is monitored to provide an indication of the salinity of said fluid.

25. Apparatus as recited in claim 1 or 10 wherein a strip transmission line is electrically connected to said stripline, so that electromagnetic energy can be transmitted thereto.

26. Apparatus as recited in claim 10 wherein said nature of said fluid is determined as a function of the distance from said antenna.

27. Method for making broadband measurements of materials having dissimilar dielectric properties comprising the steps of: forming a measuring tool having a tool face, an electromagnetic transmitting antenna and a receiving antenna, said transmitting antenna further comprising:

(a) a coaxial cable connecting means and means to transmit electromagnetic energy therethrough;

(b) a stripline adapter capable of transmitting electromagnetic energy from said coaxial cable connecting means to a stripline having a metallic central strip, said center strip having a front end, a flat strip body, a flat strip face, and a distal end, said front end electrically connected to a center conductor of said stripline adapter, said strip face bent at approximately right angles to said strip body and having a height measured from said right angle bend to said distal end that is compatible with a desired frequency coverage;

(c) a ground plane which extends from said stripline adapter to said right angle bend, so that said distal end extends away from said ground plane and so that a void exists between said center strip and said ground plane;

(d) a dielectric largely filling said void, said dielectric comprised of a material having a very high dielectric constant and a very low energy loss, so that said transmitting antenna is positioned so that said ground plane is fixedly connected to said measuring tool and said strip face is positioned to lie flush with said tool face so that said transmitting antenna can transmit electromagnetic energy into said material;

(e) an enclosure surrounding said stripline comprising four metallic walls, said walls positioned in electrical contact with said ground plane and said stripline adapter, so that said strip face is nearly centered in the opening created by said walls and said ground plane;

(f) a loss-less, non-conducting material which fills in any remaining open space in said enclosure so that said non-conducting material forms an additional wall that is nearly flat with said strip face;

(g) said receiving antenna comprised in essentially the same manner as said transmitting antenna, and positioned in said measuring tool in the same manner as said transmitting antenna, so that said receiving antenna receives said electromagnetic energy which has traveled through said material;

interconnecting said measuring tool with a means for monitoring said electromagnetic energy for changes as said measuring tool is moved across said materials whereby said dielectric properties can be measured;

interconnecting said measuring tool with a source of electromagnetic energy; and moving said measuring tool across said materials.

28. Method as recited in claim 27 wherein said transmitting antenna transmits and said receiving antenna receives electromagnetic energy over a frequency range of 2 KHz to 1 GHz.

29. Method as recited in claim 27 further comprising a means for positioning said tool face near said material.

30. Method as recited in claim 27 wherein a strip transmission line is electrically connected to said stripline, so that electromagnetic energy can be transmitted thereto.

31. Method as recited in claim 27 wherein said antennas are positioned on a pad-type device.

32. Apparatus as recited in claim 27 further comprising a plurality of receiving antennas.

33. Apparatus as recited in claim 32 further comprising a plurality of transmitting antennas.

34. Apparatus as recited in claim 27 wherein said materials having dissimilar dielectric properties are hydrocarbons and water.

35. Method as recited in claim 27 wherein said broadband measurements are taken to determine said dielectric properties as a function of distance from said antenna.

36. Method for making broadband measurements to determine the nature of a fluid in a material, comprising the steps of: forming an apparatus having a tool face, an electromagnetic transmitting antenna, and a receiving antenna, said transmitting antenna further comprising:

(a) a coaxial cable connecting means and means to transmit electromagnetic energy therethrough;

(b) a stripline adapter capable of transmitting electromagnetic energy from said coaxial cable connecting means to a stripline having a metallic central strip, said center strip having a front end, a flat strip body, a flat strip face, and a distal end, said front end electrically connected to a center conductor of said stripline adapter, said strip face bent at approximately right angles to said strip body and having a height measured from said right angle bend to said distal end that is compatible with a desired frequency coverage;

(c) a ground plane which extends from said stripline adapter to said right angle bend, so that said distal end extends away from said ground plane and so that a void exists between said center strip and said ground plane;

(d) a dielectric largely filling said void, said dielectric comprised of a material having a very high dielectric constant and a very low energy loss, so that said transmitting antenna is positioned so that said ground plane is fixedly connected to said measuring tool and said strip face is positioned to lie flush with said tool face so that said transmitting antenna can transmit electromagnetic energy into said material;

(e) an enclosure surrounding said stripline comprising four metallic walls, said walls positioned in electrical contact with said ground plane and said stripline adapter, so that said strip face is nearly centered in the opening created by said walls and said ground plane;

(f) a loss-less, non-conducting material which fills in any remaining open space in said enclosure so that said non-conducting material forms an additional wall that is nearly flat with said strip face;

(g) said receiving antenna comprised in essentially the same manner as said transmitting antenna, and positioned in said apparatus in the same manner as said transmitting antenna, so that said receiving antenna receives said electromagnetic energy which has traveled through said material;

interconnecting said measuring tool with a means for monitoring said electromagnetic energy for changes as said apparatus is moved across said material whereby said nature of said fluid can be determined;

interconnecting said apparatus with a source of electromagnetic energy; and moving said apparatus across said material.

37. Method as recited in claim 36 wherein said transmitting antenna transmits and said receiving antenna receiver electromagnetic energy over a frequency range of 2 KHz to 1 GHz.

38. Method as recited in claim 27 or 36 wherein said transmitting antenna can alternately function as a receiving antenna and said receiving antenna can alternately function as a transmitting antenna.

39. Method as recited in claim 37 further comprising a pad, said pad substantially conforming to the inside of a wellbore and holding said transmitting and receiving antennas.

40. Method as recited in claim 39 further comprising a plurality of receiving antennas.

41. Method as recited in claim 40 further comprising a plurality of transmitting antennas.

42. Method as recited in claim 41 wherein some of said antennas are positioned on said tool face and some antennas are positioned on said pad.

43. Method as recited in claim 40 wherein said antennas are staggered in a spiral fashion.

44. Method as recited in claim 37 wherein said fluids are hydrocarbons and water.

45. Method as recited in claim 27 or 36 wherein said ground plane is no greater than 10 mm in length.

46. Method as recited in claim 27 or 36 wherein said strip face has a height that is no greater than 5 mm.

47. Method as recited in claim 27 or 36 wherein said electromagnetic energy is monitored to provide an indication of the porosity of said formation.

48. Method as recited in claim 27 or 36 wherein said electromagnetic energy is monitored to provide an indication of the water saturation of said formation.

49. Method as recited in claim 27 or 36 wherein said electromagnetic energy is monitored to provide an indication of the salinity of said formation.

50. Method as recited in claim 27 or 36 wherein a strip transmission line is electrically connected to said stripline, so that electromagnetic energy can be transmitted thereto.

51. Method as recited in claim 36 wherein said nature of said fluid is determined as a function of the distance from said antenna.

* * * * *